US009824400B2

(12) United States Patent
Kattuparambil et al.

(10) Patent No.: US 9,824,400 B2
(45) Date of Patent: Nov. 21, 2017

(54) COST ITEM LIFE CYCLE VIEWER WITH CONFIGURABLE DOCUMENT TRAVERSAL OPTIONS

(71) Applicant: Oracle International Corporation, Redwood Shores, CA (US)

(72) Inventors: Biju Subramunian Kattuparambil, Sunnyvale, CA (US); Yue Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 129 days.

(21) Appl. No.: 13/940,099

(22) Filed: Jul. 11, 2013

(65) Prior Publication Data
US 2015/0019392 A1 Jan. 15, 2015

(51) Int. Cl.
| | |
|---|---|
| *G07B 17/00* | (2006.01) |
| *G07F 19/00* | (2006.01) |
| *G06Q 40/00* | (2012.01) |
| *G06Q 10/00* | (2012.01) |
| *G06Q 30/00* | (2012.01) |

(52) U.S. Cl.
CPC .................................. *G06Q 40/12* (2013.12)

(58) Field of Classification Search
CPC ...... G06Q 10/103; G06Q 30/06; G06Q 40/12; G06Q 50/182
USPC ......................................................... 705/30
See application file for complete search history.

(56) References Cited

U.S. PATENT DOCUMENTS

| | | | | | |
|---|---|---|---|---|---|
| 4,994,964 | A | * | 2/1991 | Wolfberg | G06Q 40/02 705/30 |
| 5,454,104 | A | * | 9/1995 | Steidlmayer | G06Q 40/02 |
| 2001/0042239 | A1 | * | 11/2001 | Nagashima | G06F 8/24 717/100 |
| 2002/0184121 | A1 | * | 12/2002 | Sijacic | G06Q 40/12 705/30 |

(Continued)

OTHER PUBLICATIONS

Netsuite ERP, "Data Sheet", Copyright Notice dated 2011 (10 pages).

(Continued)

*Primary Examiner* — Ig T An
(74) *Attorney, Agent, or Firm* — Vista IP Law Group, LLP

(57) ABSTRACT

A method, system, and computer program product for enterprise accounting software applications. The computer implemented method commences upon receiving a single user-specified indication of a subject cost item. Then, responsive to the single user-specified indication, the method traverses from the subject cost item to at least one of a successor cost item or a predecessor cost item. Then, still responsive to the single user-specified indication of a subject cost item, the method proceeds to automatically retrieve information from the successor cost item or from the predecessor cost item. Then, still responsive to the single user-specified indication, the method invokes operations for displaying a representation of the subject cost item in a juxtaposition to the automatically traversed-to items. A user can configure traversing from a purchase requisition to a purchase order, and/or traversing from a purchase order to a payable invoice, and/or traversing from a payable invoice to a project expenditure.

19 Claims, 8 Drawing Sheets

(56) References Cited

U.S. PATENT DOCUMENTS

| | | | |
|---|---|---|---|
| 2006/0041518 A1* | 2/2006 | Blair | G06F 17/227 705/80 |
| 2006/0041840 A1* | 2/2006 | Blair | G06F 17/227 715/249 |
| 2006/0229896 A1* | 10/2006 | Rosen | G06Q 10/1053 705/321 |
| 2007/0150364 A1* | 6/2007 | Monaghan | G06Q 10/10 705/26.1 |
| 2010/0106652 A1* | 4/2010 | Sandholm | G06Q 10/04 705/80 |
| 2010/0106653 A1* | 4/2010 | Sandholm | G06Q 10/04 705/80 |
| 2010/0250407 A1* | 9/2010 | Silva | G06Q 20/04 705/30 |

OTHER PUBLICATIONS

Acumatica, "Inventory Management Software", Copyright Notice dated 2013 (4 pages).

Oracle Hyperion Financial Management, Copyright Notice dated 2013 (4 pages).

Acumatica, "Project Accounting Suite", Copyright Notice dated 2013 (3 pages).

Intacct, "Intact Global Consolidations Product Brief", Copyright Notice dated 2009 (3 pages).

Intacct Project Accounting, Intacct Corporation, Copyright Notice dated 2013 (2 pages).

Acumatica Reporting Tools, Copyright Notice dated 2013 (3 pages).

\* cited by examiner

COST ITEM LIFE CYCLE VIEWER WITH CONFIGURABLE DOCUMENT TRAVERSAL OPTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise accounting software applications and more particularly to techniques for configuring a cost item life cycle viewer for easy traversal and access to documents pertaining to the cost item.

BACKGROUND

Business managers have been heard to exclaim, "Who authorized THAT", upon seeing a larger-than-expected cost item. Such an exclamation is heard frequently, and in the age of ever larger and larger ecosystems and more and more complex business dealings, legacy techniques to answer the question, "Who authorized THAT" becomes onerous. Legacy solutions merely allow the user to manually drill down from the current document to the immediate predecessor document. For example, if the business manager made the exclamation at the sight of a purchase order, then retrieval of the details of the corresponding purchase requisition and its authorization signatures might answer the business manager's question. If, however the business manager made the exclamation at the sight of a line item in an accounts payable listing, then there might be many more retrievals needed to be accomplished before getting the answer to, "Who authorized THAT". Legacy techniques merely allow a user to manually drill down from the current document to the immediate predecessor document (e.g., from a line item in an accounts payable listing to a corresponding line item in a purchase order). If there are multiple document levels then the aforementioned legacy techniques force the user to manually keep on drilling down. In some legacy situations a report indicates a flow (e.g., through a life cycle) from cost inception to cost payment, yet this technique fails to reduce the number of keystrokes. If the user has a long list of cost items to research, the task can balloon into an onerous task involving a huge number of keystrokes, thus resulting in loss of productivity.

What's needed are techniques to easily integrate the various software applications making-up an accounting system with a configurable cost item life cycle viewer that can accept and act on configurable document traversal options.

SUMMARY

The present disclosure provides an improved method, system, and computer program product suited to address the aforementioned issues with legacy approaches. More specifically, the present disclosure provides a detailed description of techniques used in methods, systems, and computer program products for a cost item life cycle viewer with configurable document traversal options.

The computer implemented method commences upon receiving from a user a single user-specified indication of a subject cost item. Then, responsive to the single user-specified indication, the method traverses from the subject cost item to at least one of a successor cost item or a predecessor cost item. Then, still responsive to the single user-specified indication of a subject cost item, the method proceeds to automatically retrieve information from at least one successor cost item (or from the predecessor cost item). Then, still responsive to the single user-specified indication, the method invokes operations for displaying a representation of the subject cost item in juxtaposition to the traversed-to successor cost item or to the traversed-to predecessor cost item.

The method implementation can further comprise configuring the act of traversing from the subject cost item to a successor cost item to include traversing from a purchase requisition to a purchase order, and/or traversing from a purchase order to a payable invoice, and/or traversing from a payable invoice to a project expenditure.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
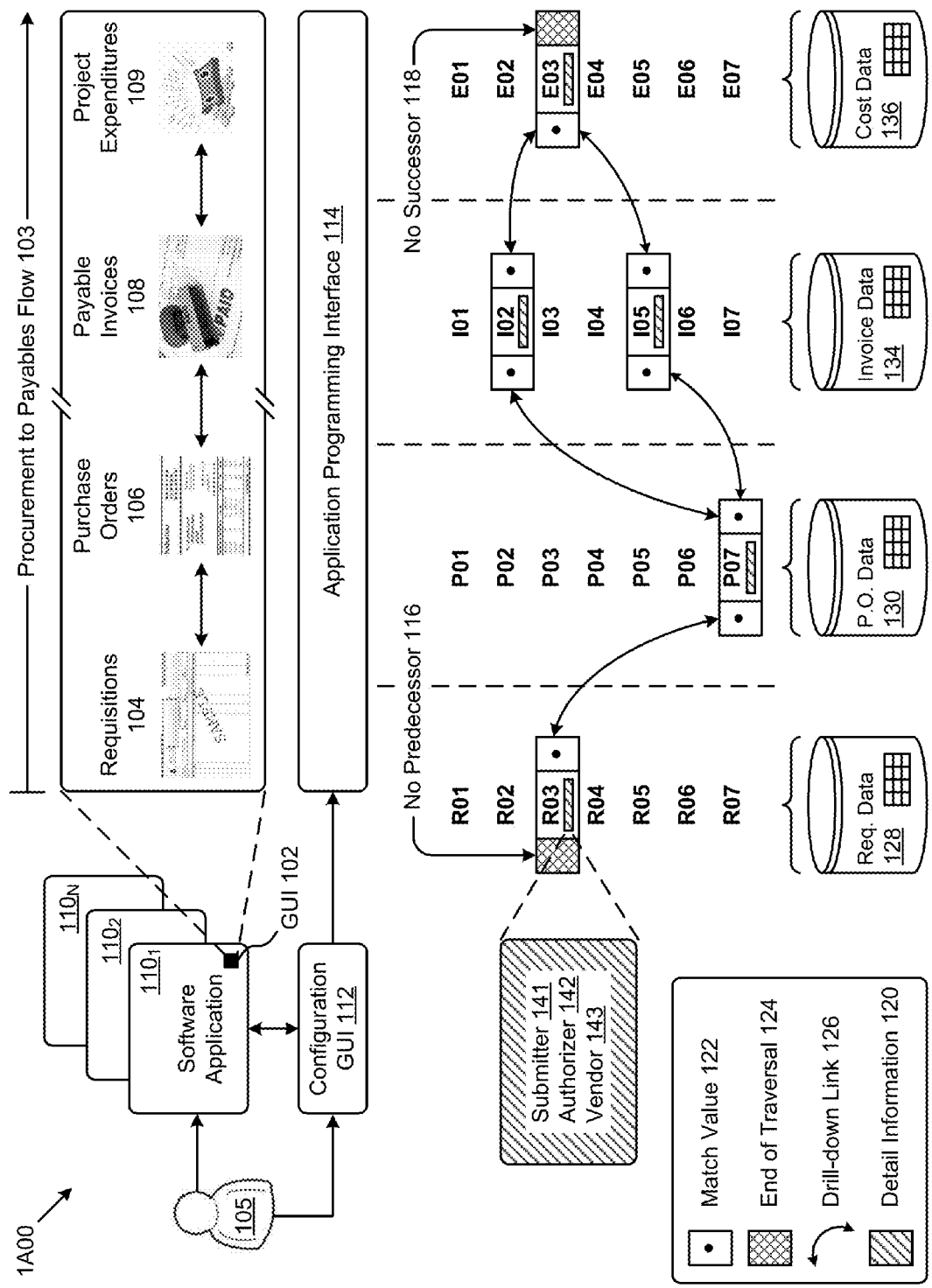
FIG. 1A depicts a subsystem for implementing aspects of a cost item life cycle viewer with configurable document traversal options, according to some embodiments.

Some embodiments of the present disclosure describe techniques to easily integrate the various software applications comprising an accounting system with a configurable cost item life cycle viewer that can accept and act on configurable document traversal options. Some embodiments are directed to an approach for displaying configurable document traversal options and then using the document traversal options with a cost item life cycle viewer. More particularly, disclosed herein and in the accompanying figures are exemplary environments, methods, and systems for making and using a cost item life cycle viewer that implements configurable document traversal options.

Overview

The cost item life cycle viewer disclosed herein allows individuals (e.g., auditors, manager, etc.) to view a graphical representation of a "cost trail". The graphical representation presents a history and/or progression of a cost item in a single, easy-to-understand visual representation by merely taking one trigger action to identify a subject cost item. The foregoing trigger action invokes processes that drill down or otherwise traverse multiple databases, retrieve a trail of documents, and present the documents and/or items therein in an easy-to-understand graphical representation of the correspondence between a document and/or an aspect of such a document and the subject cost item.

As earlier indicated, the automated drill-down capability facilitates iterative navigations (e.g., to software applications), retrievals (e.g., of documents), displays (e.g., of line items or portions of the documents, etc.), which in turn can drastically reduce the keystrokes, retrieval steps, and overall time required to audit the cost item.

To facilitate this, document data retrieval can be automated. Also, the traversals through the various databases to start points and end points (e.g., to a terminal predecessor document, or to a terminal successor document) can be configured. For example, a user can specify and/or configure a flow that corresponds to the particular infrastructure used at the user's site. Such a configuration can capture the details of a representative life cycle or data flow through that particular infrastructure. Yet, embodiments of the present disclosure can serve in a wide range of settings that in turn use a wide range of infrastructure.

Strictly as examples, configuration parameters can comprise:

Flow name,
Document,
Document image and location,
Next document,
Document task flow/page details, and
Task flow/page parameters.

The foregoing configuration parameters, together with aspects of their use in a cost item life cycle viewer, are further shown and discussed below.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a subsystem 1A00 for implementing aspects of a cost item life cycle viewer with configurable document traversal options. As an option, the present subsystem 1A00 or any aspect thereof may be implemented in the context of the architecture and functionality of the embodiments described herein. Also, the subsystem 1A00 or any aspect thereof may be implemented in any desired environment.

As shown, a user 105 interacts with a plurality of accounting software applications (e.g., software application $110_1$, software application $110_2$, software application $110_N$, etc.) through one or more instances of a graphical user interface (e.g., GUI 102). The interactions can include a variety of activities, and such activities may relate to processing departmental spending requests (e.g., requisitions 104), turning spending requests into purchase instruments (e.g., purchase orders 106), processing invoices to be scheduled for payment (e.g., payable invoices 108), and dealing with project expense accounting items (e.g., project expenditures 109). In exemplary situations, a traversal through activities from requisition to payment of an expense is characterized as a flow (e.g., procurement to payables flow 103), and shown.

The software applications corresponding to the aforementioned activities may include accessing (e.g., READ/WRITE access) to databases that in turn comprise documents and/or tables (e.g., requisition data 128, P.O. data 130, invoice data 134, cost data 136, etc.). Strictly as examples, such documents and/or tables can further comprise cost items in the form of individually-identifiable requisitions or requisition line items (e.g., R01, R02 . . . R07), individually-identifiable purchase orders or purchase order line items (e.g., P01, P02 . . . P07), individually-identifiable invoices or invoice line items (e.g., I01, I02 . . . I07), and/or individually-identifiable project expenditure listings or project expenditure listing line items (e.g., E01, E02 . . . E07). A traversal through activities from requisition to payment of an expense is characterized as a flow (e.g., procurement to payables flow 103). Such a flow can be named and reused (e.g., see item 303 of FIG. 3). One particular traversal is shown from requisition line item R03 to successor P.O. line item P07, to two successor invoice line items I02 and I05, and to successor expenditure line item E03. As shown, there are no successors from expenditure line item E03 (see no successor 118). On the opposite side of the shown traversal is requisition line item R03 which has no predecessor line items (see no predecessor 116). The foregoing traversal is strictly an example. Other embodiments follow a flow whereby a given invoice line item maps to its corresponding individual line item cost.

For depicting the traversal of items from R03 to E03, the items are shown with a link (e.g., drill-down link 126), and an indication of a match (e.g., match value 122, as shown). Also, the item R03 indicates no predecessor (e.g., see end of traversal 124 to the left of R03) and item R03 indicates no successor (e.g., see end of traversal 124 to the right of item E03). As shown, the intervening items between the beginning and the end of the traversal from item R03 to item E03 each have at least one match value indication (e.g., see match value 122).

Any given item in the shown traversal can include further detail information. Strictly as an example, the requisition item R03 includes instances of detail information 120, which in turn includes data entries that characterize the requisition item R03. As shown, requisition item R03 lists the submitter 141, an authorizer 142, and a vendor 143. Such detail information as enumerated in the foregoing are merely examples, and other details are reasonable and envisioned, including as described in some embodiments discussed below.

Continuing this description of FIG. 1A, a user 105 can interact with a configuration user interface (e.g., configuration GUI 112), and any software application can access any aspect of any parameters used in the context of the configuration user interface. Moreover, an application programming interface 114 can access any aspect of any parameters used in the context of the configuration user interface, and any of the used parameters can serve to configure the application programming interface itself, or any application access via the application programming interface. The configuration parameters can be stored persistently in any repository using any known-in-the-art storage technique.

As such, the subsystem 1A00 serves to receive (e.g., from a user), a single user-specified indication of a subject cost item and, responsive to the single user-specified indication, traversing from the subject cost item to at least one of a successor cost item or a predecessor cost item. Further steps serve to retrieve at least some information from the successor cost item or the predecessor cost item, and to display a representation of information pertaining to the subject cost item in a juxtaposition to at least one of the successor cost items or the predecessor cost items.

Various other functions and implementation alternatives are discussed herein. In particular, flows and other techniques for configuring document traversal options are disclosed in FIG. 1B and the corresponding discussion as follows.

Figure 1B:
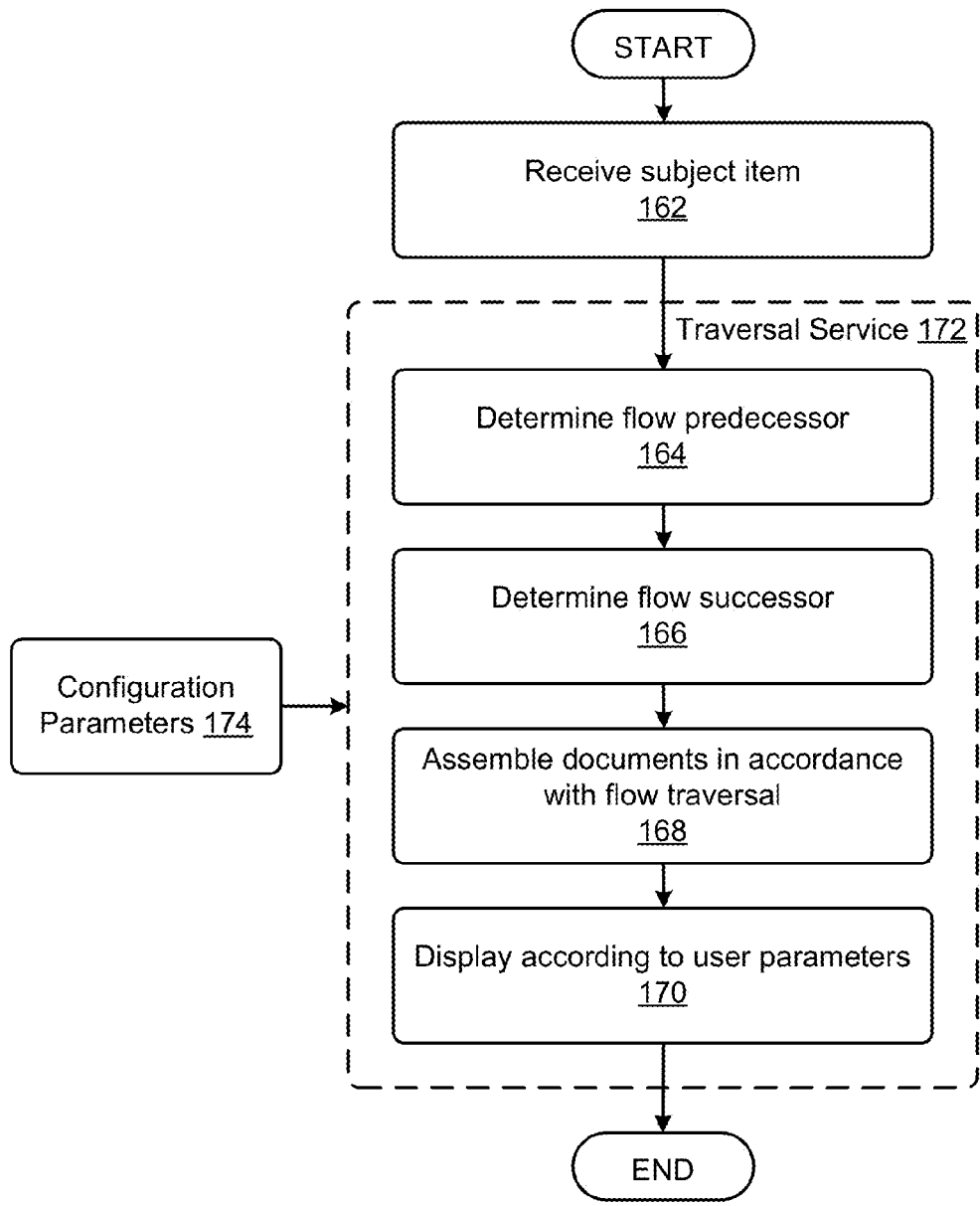
FIG. 1B is a flow diagram of a portion of a subsystem for implementing aspects of a cost item life cycle viewer with configurable document traversal options, according to some embodiments.

FIG. 1B is a flow diagram of a portion of a subsystem 1B00 for implementing aspects of a cost item life cycle viewer with configurable document traversal options. As an option, the present subsystem 1B00 or any aspect thereof may be implemented in the context of the architecture and functionality of the embodiments described herein. Also, the subsystem 1B00 or any aspect thereof may be implemented in any desired environment.

The subsystem 1B00 implementing aspects of a cost item life cycle viewer are now discussed. Document traversals are configurable using a traversal service 172 that reads from a repository of configuration parameters 174 (e.g., user-configured parameters). The traversal service 172 receives an additional input, for example a subject item input by a user (see operation 162). The subject item can be any item along a traversal. For example, and following the foregoing traversal as described in FIG. 1A, a subject item can be a particular purchase order, for example item P07. The traversal service can determine the flow predecessor (see operation 164) and the flow successor (see operation 166). Again referring to the foregoing example of FIG. 1A, the flow predecessor of item P07 is item R03 (which item R03 itself has no predecessor), and the flow successors of item P07 are item I02 and item I05. In an accounting situation, this can mean "Purchase Order P07 was generated based on Purchase Requisition R03". And further, "There are two invoice items against Purchase Order P07, namely invoice item I03 and invoice item I05".

Having discovered the specific traversal (which may comprise multiple paths), the traversal service can assemble the specific documents encountered in the traversal through the traversal path or paths (see operation 168). In this case, the documents assembled include requisition item R03, purchase order item P07, invoice item I02, invoice item I05, and project expenditure item E03.

As earlier indicated, any item can include additional detail (e.g., see detail information 120) and such detail information can be collected programmatically by a traversal service 172. And, the item and any constituent detail information can be displayed according to user parameters (see operation 170). Such a traversal service can be used to facilitate use cases in the context of a system for implementing a cost item life cycle viewer with configurable document traversal options (see system 500 of FIG. 5).

Figure 2B:
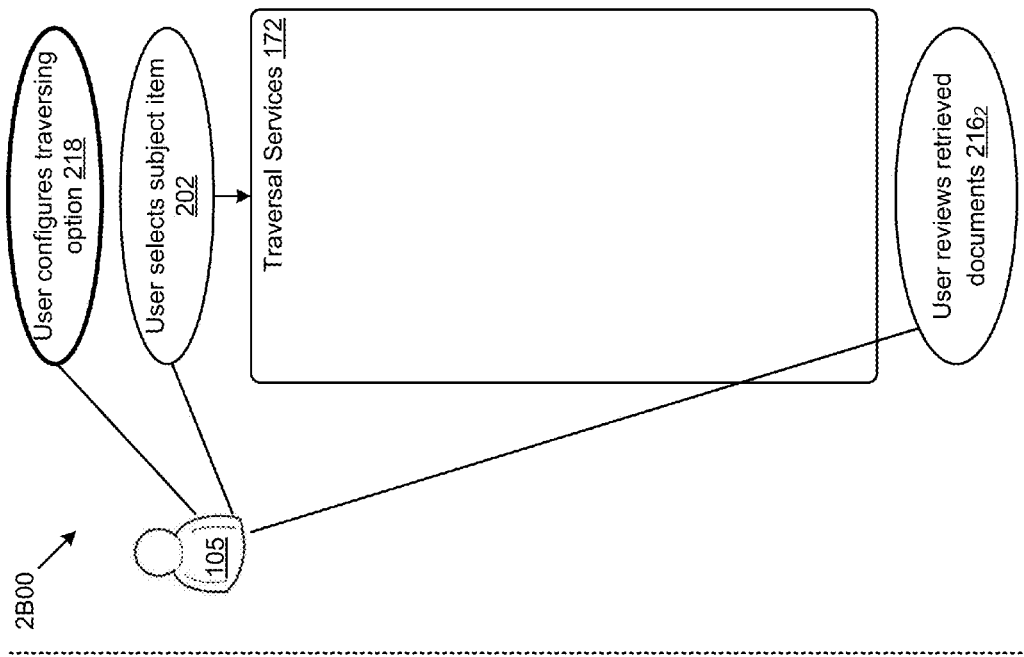
FIG. 2B is an improved use case for using a cost item life cycle viewer with configurable document traversal options, according to some embodiments.
Figure 2A:
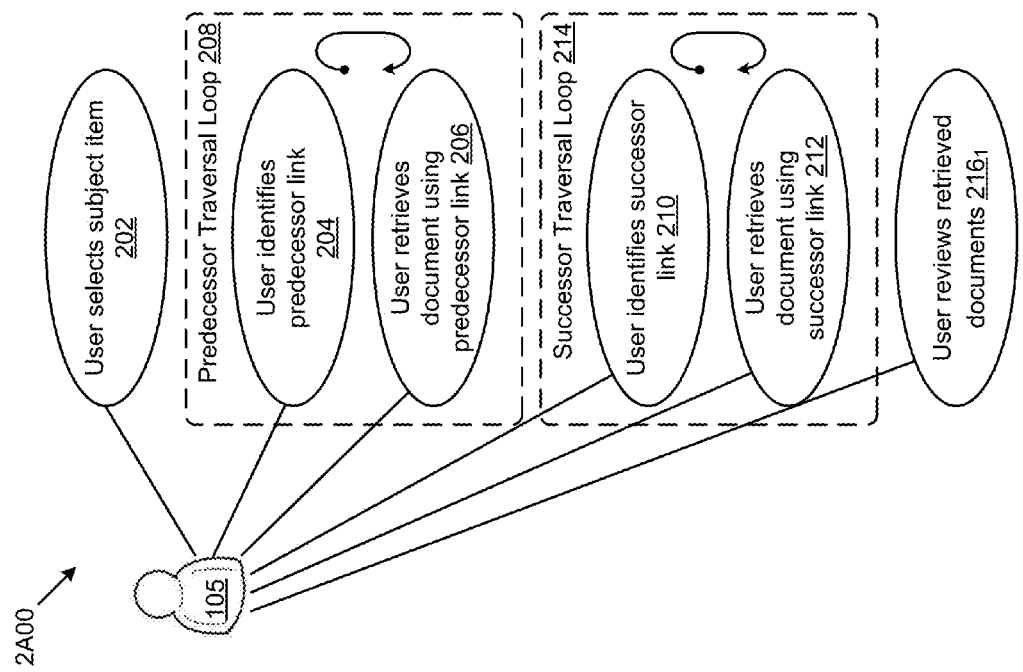
FIG. 2A is a use case for comparing a user-intensive use case to aspects of a configurable cost item life cycle viewer, according to some embodiments.

FIG. 2A is a use case 2A00 for comparing a user-intensive use case to aspects of a configurable cost item life cycle viewer. As an option, the present use case 2A00 or any aspect thereof may be implemented in the context of the architecture and functionality of the embodiments described herein. Also, the use case 2A00 or any aspect thereof may be implemented in any desired environment.

As shown, the use case 2A00 describes a wide range of activities, namely an activity where a user selects a subject item (see activity 202), an activity where a user identifies a predecessor link (see operation 204), an activity where a user retrieves documents using the predecessor link (see operation 206), an activity where a user identifies a successor link (see operation 210), and activity where a user retrieves documents using the successor link (see operation 212), and an activity where the user reviews the retrieved documents (see activity 216₁).

The predecessor activities might be executed by the user in a loop (see loop 208) and the successor activities might also be executed by the user in a loop (see loop 214).

This use case 2A00 serves at least one desired result, namely that the user reviews the retrieved documents (see activity 216₁). Using the foregoing techniques of pre-configuring flows, many of the user-intensive activities can be automated (e.g., using traversal services 172) as shown. A use case using automated, configured traversal services is presently discussed.

FIG. 2B is an improved use case 2B00 for using a cost item life cycle viewer with configurable document traversal options. As an option, the present use case 2B00 or any aspect thereof may be implemented in the context of the architecture and functionality of the embodiments described herein. Also, the use case 2B00 or any aspect thereof may be implemented in any desired environment.

As shown, the use case 2B00 distinguishes from the use case 2A00 at least in that the user configures traversing options (see activity 218) before selecting a subject item (see activity 202). Then traversal services are performed without user interaction. When the traversal services have completed, the user reviews the retrieved documents 216₂ (e.g., the documents retrieved by the traversal services).

Figure 3:
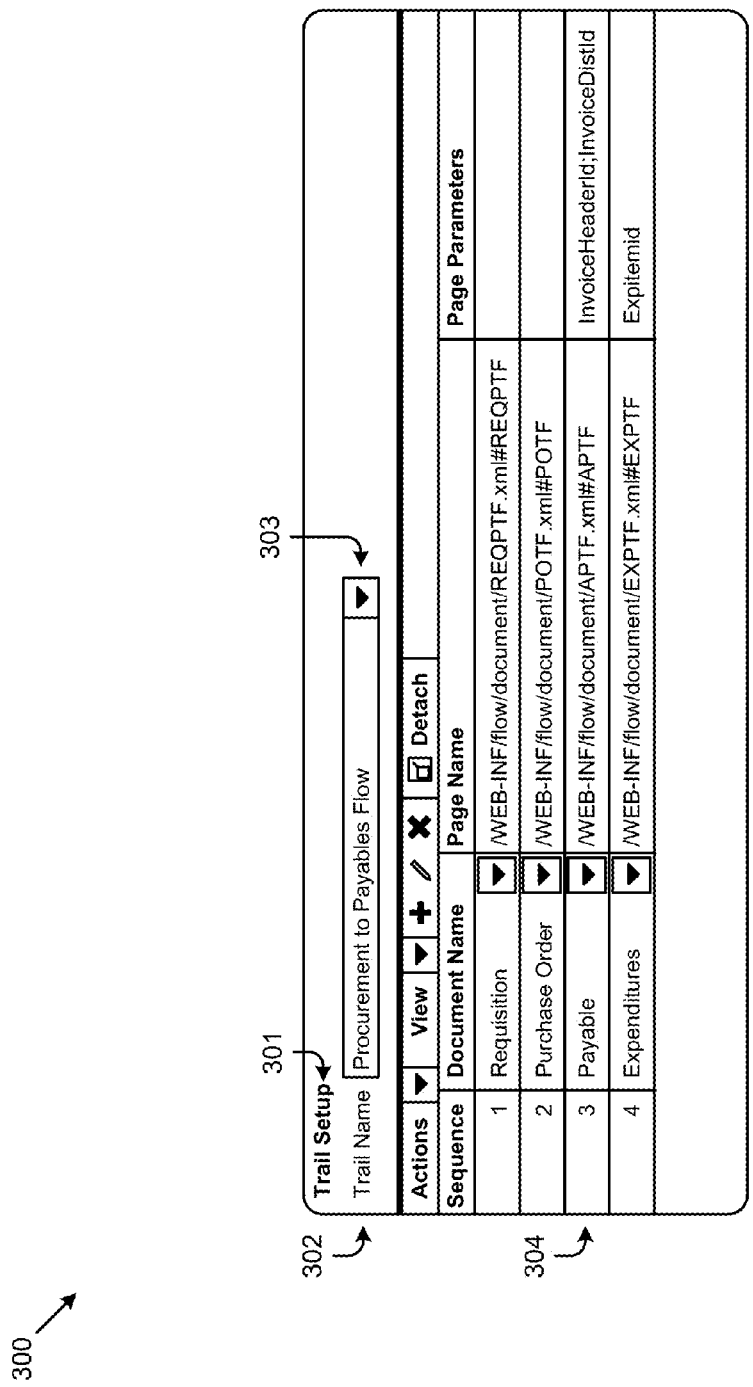
FIG. 3 is a simplified rendering of a configuration parameter screen device used in a system for comparing aspects of a cost item life cycle viewer with configurable document traversal options, according to some embodiments.

FIG. 3 is a simplified rendering of a configuration parameter screen device 300 used in a system for comparing aspects of a cost item life cycle viewer with configurable document traversal options. As an option, the present configuration parameter screen device 300 or any aspect thereof may be implemented in the context of the architecture and functionality of the embodiments described herein. Also, the configuration parameter screen device 300 or any aspect thereof may be implemented in any desired environment.

A traversal through documents used in an audit trail can be established using a trail setup configurator (configuration parameter screen device 300). As shown, the configuration parameter screen device is entitled "Trail Setup" (see item 301) and the trail can be named; in this case the trail name 302 is configured as "Procurement to Payables Flow" (see item 303).

The starting point for any cost audit can be set by a user. In the example of configuration parameter screen device 300, the sequence comprises traversal through items 1, 2, 3, and 4. A document name can be set using a document name pull-down (see "Payable" setting of row 304) and the particulars of page name and any optional page parameters can be configured.

In operation, when the user invokes the configuration parameter screen device 300 from a document, that document is set as the default starting point of the trail. Then, the default can be changed such that any one or more predecessor or successor document levels to be traversed can be set using the pull-downs.

Using a configuration parameter screen device, the trail name and the associated document can be configured in accordance with various approaches such as:

Administrative Approach: A configuration UI (e.g., configuration parameter screen device 300) allows an implementer to key in trail name (see item 303) and the documents corresponding to the keyed-in trail name. In some cases a combo box widget, is used to allow either a pull-down selection of existing stored values or the combo box widget allows new values to be keyed-in or otherwise entered. The administratively-established trails can be stored for later retrieval.

User Approach: A separate configuration UI (e.g., a variation of configuration parameter screen device 300) is provided such that an implementer can define the trail names and the associated documents (e.g., corresponding to a particular business or activity within a business). In this approach, the implementer selects the trail name from the administratively-established trails (e.g., in a drop down list).

Hybrid Approach: In this hybrid approach, an administrator establishes flows and documents that are accessible to a non-administrator user (but not changeable by such a non-administrator user). A non-administrator user can access the administratively-established trails (and its administratively-established document configurations). When an administratively-established trail name is selected, then only the administratively-established document configurations show up in the document list of values.

In some embodiments of a trail setup configurator, a user can temporarily override the settings by selecting (and overriding) alternative predecessor/upstream or successor/downstream levels. The changed settings persist until the session is terminated.

Figure 4:
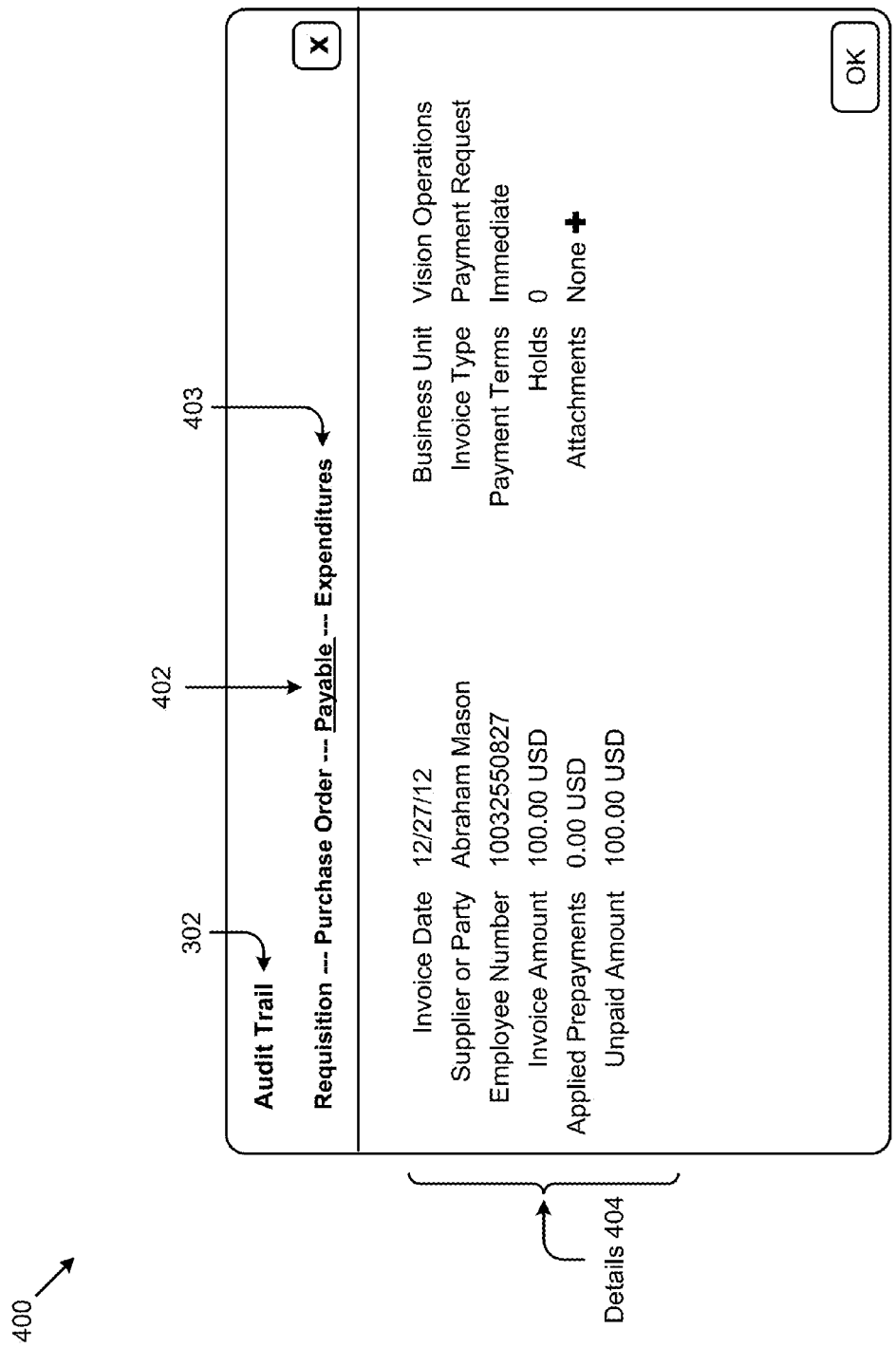
FIG. 4 is a simplified rendering of a drill-down screen device for comparing aspects of a cost item life cycle viewer with configurable document traversal options, according to some embodiments.

The predecessor/successor settings in force (e.g., default settings or administratively-established settings or user overridden settings) are used when rendering the drill-down screens in the cost item life cycle viewer, which drill-down screens are presently discussed in FIG. 4.

FIG. 4 is a simplified rendering of a drill-down screen device 400 for comparing aspects of a cost item life cycle viewer with configurable document traversal options. As an option, the present drill-down screen device 400 or any aspect thereof may be implemented in the context of the architecture and functionality of the embodiments described herein. Also, the drill-down screen device 400 or any aspect thereof may be implemented in any desired environment.

As earlier indicated, the predecessor/successor settings in force are used when rendering the drill-down screens in the cost item life cycle viewer. Such a drill-down screen can comprise a trail name (see trail name 302 shown as "Audit Trail" in FIG. 4), a flow name or flow name expansion (e.g., see flow name expansion shown as expansion 403), a document source indication 402, and an indication of other documents that were found when traversing through documents found along the flow named by the trail name.

More particularly, a drill-down screen device 400 provides a graphical user interface for viewing the details 404 of a particular document. Some of the foregoing examples use a technique where there is a mapping from a trail name to a flow that comprises a sequenced set of constituent documents. Following an alternative technique, a document can map itself to a flow. In some embodiments of this alternative technique any (or every) given document itself includes at least one trail identifier. Thus, given a document, at least one trail can be determined. It is possible that a single given document can include more than one trail identifier, and it is possible that a single given document can include a sequencing indicator such that a sequenced flow can be constructed from a given set of constituent documents.

Figure 5:
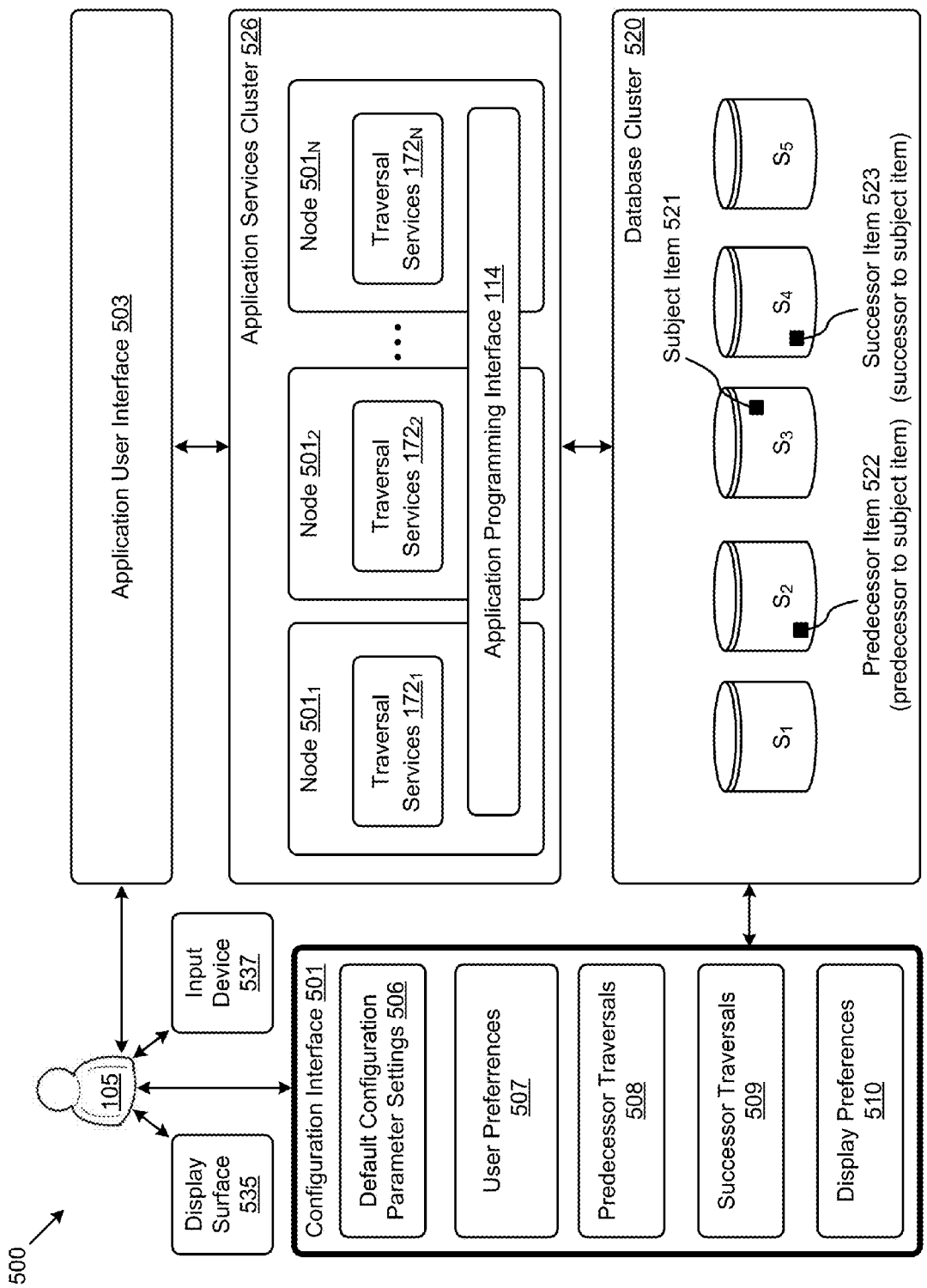
FIG. 5 is a block diagram of a system for implementing a cost item life cycle viewer with configurable document traversal options, according to some embodiments.

FIG. 5 is a block diagram of a system 500 for implementing a cost item life cycle viewer with configurable document traversal options. As an option, the present system 500 or any aspect thereof may be implemented in the context of the architecture and functionality of the embodiments described herein. Also, the system 500 or any aspect thereof may be implemented in any desired environment.

The user 105 interacts with an application user interface 503 and a configuration interface 501. The configuration interface can accept user input in the form of clicks or swipes or keystrokes or pull-down operations, or any other form of user interaction so as to indicate one or another value from any of a small number (or a large number) of choices.

Strictly as examples, a configuration interface can accept user input in the form of a user indication (e.g., using an input device 537 such as a mouse click) of any one or more default configuration parameter settings 506, or user preferences 507. In some cases, predecessor traversals 508 can be configured to traverse through a sequence of predecessor documents to find a predecessor item (e.g., a predecessor item being a component of a predecessor document). Also, successor traversals 509 can be configured to traverse through a sequence of successor documents to find a successor item (e.g., a successor item being a component of a successor document). Further, the user 105 can establish display preferences 510. Any of the configuration parameters can be stored in a configuration data structure, possibly in a file or in a relation or in any other storage facility.

The configuration operations to establish the default configuration parameter settings 506 can be performed by user 105. The user can be an administrative user or a non-administrative user. The interface captures one or more mechanisms for referring to a document unambiguously. For example, for an invoice document, an invoice number can be used as an unambiguous reference or key parameter.

The configuration operation to establish the predecessor traversals 508 provides a user interface (e.g., display surface 535, input device 537, etc.), which configurations are used to capture aspects of predecessor documents to be traversed, and/or a manner of traversal. The configuration operations to establish the predecessor traversals can establish a particular sequence, and the particular sequence can be associated with a trail (e.g., in a document-to-trail mapping scenario). Or (e.g., in a trail-to-document mapping scenario), the configuration can be based on the trail, where a sequence of predecessor documents can be configured. For example a predecessor document for an expenditure cost can be an invoice cost (e.g., in a period-end accrual flow). Or, a predecessor document for an expenditure cost can be a receipt cost (e.g., in an "accrue on receipt" cost accounting regime).

The configuration operation to establish the successor traversals 509 provides a user interface to capture successor documents to be traversed. The configuration operations to establish the successor traversals can establish a particular sequence, and the particular successor sequence can be associated with a trail.

The configuration operation to establish display preferences 510 provides a user interface to capture a number of default levels of traversal that are initially exposed in a user interface. For example, if the predecessor level is set to "1", then only one predecessor document (e.g., the immediate one predecessor document) is displayed. Similarly if the successor level is set to "2", then only two successor document are displayed for initial user interaction.

Now, turning to other components of system 500, the application user interface 503 can interact with nodes (e.g., node $501_1$, node $501_2$, node $501_N$, etc.) within a multi-processor system (e.g., application services cluster 526), and any processor with such a multi-processor system can use all or a portion of an application programming interface 114 (API) for example, when processing traversals, retrievals, assemblies, and/or displays or preparations for display of materials processed by traversal services (e.g., traversal services $172_1$, traversal services $172_2$, traversal services $172_N$, another traversal services engine, etc.). The act of returning a representation of information for the identified successor cost item or the predecessor cost item for display, and/or the act of displaying materials can be facilitated using aspects of a display surface (e.g., the display screen or screens of a monitor or monitors, or of a tablet or of any display device). The act of storage and/or of traversals and/or of retrievals can be facilitated using a database cluster 520.

Strictly as examples, an instance of traversal services might use the API when accessing a subject item 521 (e.g., a purchase order or a line item in a purchase order), and/or when accessing a predecessor item 522 (e.g., a purchase requisition or line item in a purchase requisition), and/or when accessing a successor item 523 (e.g., an invoice or line item in an invoice).

Additional Embodiments of the Disclosure

Figure 6:
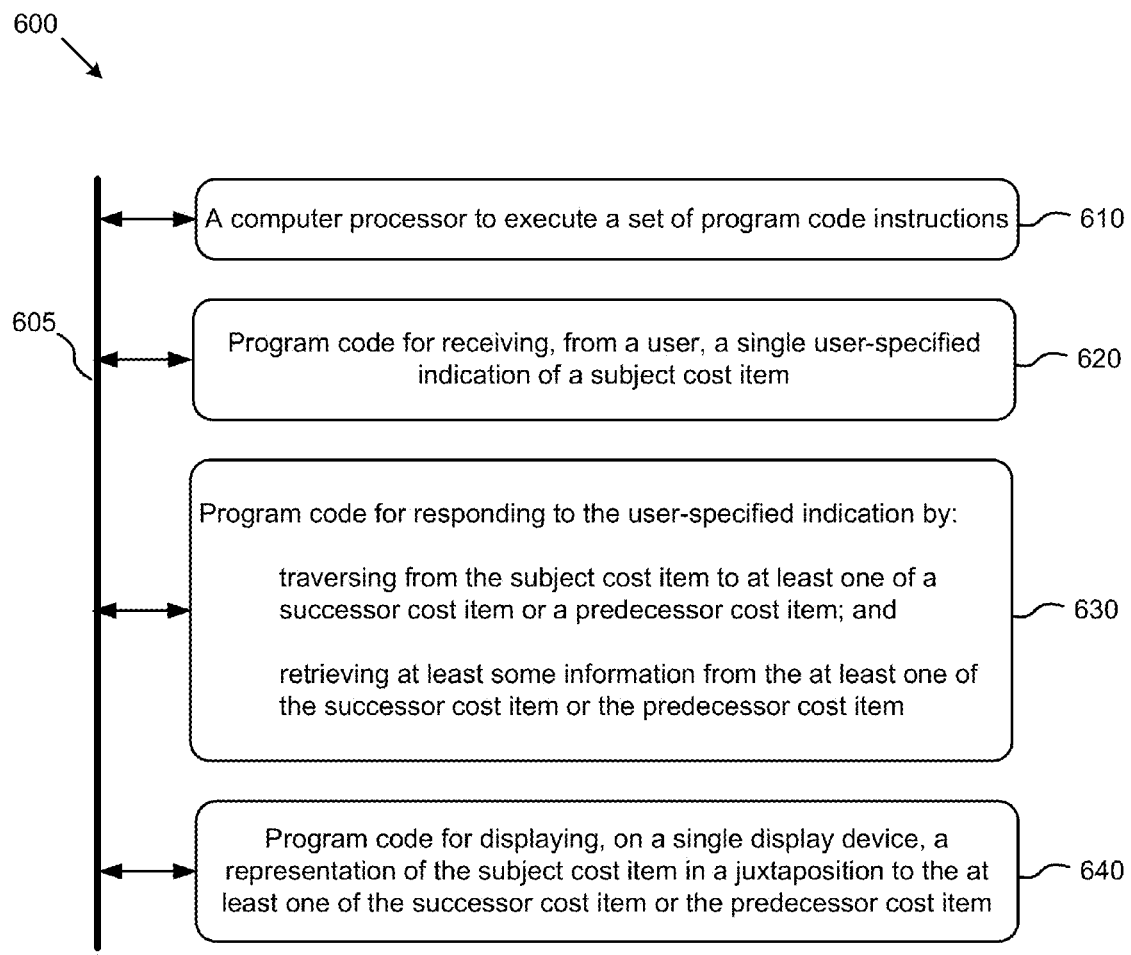
FIG. 6 is a block diagram of a system for implementing a cost item life cycle viewer with configurable document traversal options, according to some embodiments.

FIG. 6 is a block diagram of a system 600 for implementing a cost item life cycle viewer with configurable document traversal options, according to some embodiments. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. An operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: receiving, from a user (e.g., directly or indirectly), a single user-specified indication of a subject cost item (see module 620); responding to the user-specified indication by traversing from the subject cost item to at least one of a successor cost item or a predecessor cost item and retrieving at least some information from the at least one of the successor cost item or the predecessor cost item (see module 630); then displaying, on a single display device, a representation of the subject cost item in a juxtaposition to at least one of the successor cost item or the predecessor cost item (see module 640).

In this embodiment, system 600 further comprises a module for configuring the act of traversing from the subject cost item to a successor cost item. The configuration aspects comprise at least one of, traversing from a purchase requisition to a purchase order, traversing from a purchase order to a payable invoice, or traversing from a payable invoice to a project expenditure.

In another alternative System 600 further comprises a module for configuring the act of traversing from the subject cost item to a predecessor cost item. The configuration aspects comprise at least one of, traversing from a project expenditure to a payable invoice, traversing from a payable invoice to a purchase order, or traversing from a purchase order to a requisition.

System Architecture Overview

Figure 7:
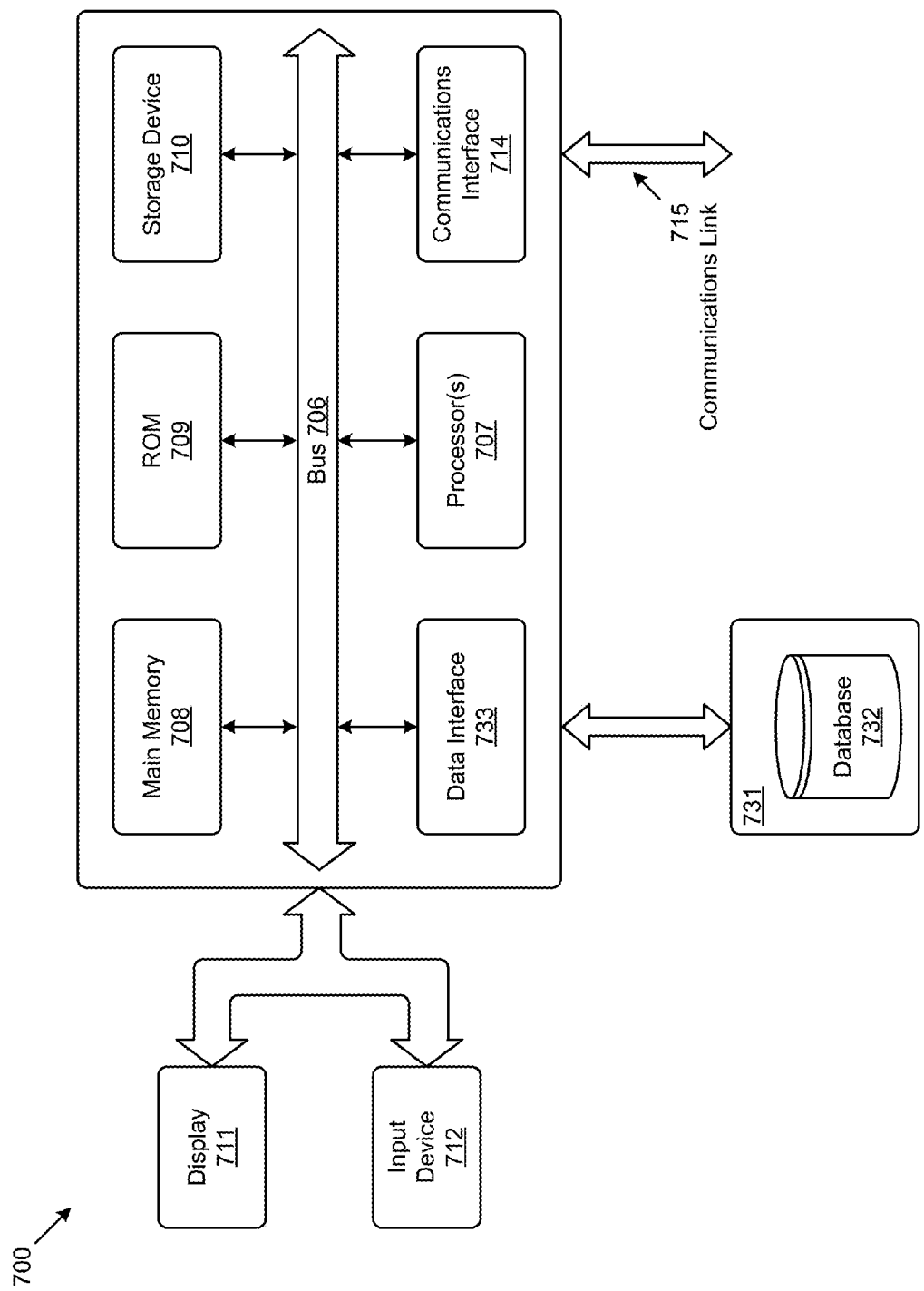
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method, the method comprising:
   receiving, from a user interface, a single user-specified indication of a subject item; and
   associating, by a configurable traversal service module stored in memory and functioning in tandem with at least a micro-processor of a computing system, a plurality of items with one or more respective match indicators that comprise one or more corresponding data item each having a match value, the plurality of items stored in a plurality of database tables in one or more databases residing on a plurality of computing nodes;
   in response to the single user-specified indication,
   configuring, by the configurable traversal service module, the plurality of items with the one or more respective match indicators;
   predetermining a predetermined flow in response to the single user-specified indication of the subject item;
   pre-configuring a number of levels to be traversed for the configurable traversal service module with one or more configuration parameters stored in a repository in response to the single user-specified indication;
   determining, by the configurable traversal service module without user interactions, a traversal path through the plurality of databases tables based at least in part upon the number of levels and the predetermined flow at least by:
      identifying a first match indicator associated with the subject item and having a first match value;
      identifying a second match indicator having a second match value based in part or in whole upon the predetermined flow, the second match value of the second match indicator corresponds to the first match value of the first match indicator associated with the subject item;
      identifying an immediately adjacent item that is associated with the second match indicator from a second database table of the plurality of database tables; and
      inserting a link between the immediately adjacent item and the subject item for the traversal path;
   accessing the plurality of database tables associated with a plurality of computing nodes at least by traversing one or more links along the traversal path linking the subject item to one or more immediately adjacent items by the configurable traversal service module in the computing system via a computer network;
   traversing, at the configurable traversal service module, one or more levels from the subject item to the immediately adjacent item along the traversal path;
   retrieving, at the configurable traversal service module, at least some information for the immediately adjacent item from the first database table and pertinent information for the subject item from a second database table of the plurality of database tables residing on the plurality of computing nodes; and
   assembling the at least some information and the pertinent information in a representation of a data flow pertaining to the subject item in a single view at the user interface, the representation presenting correspondence between the pertinent information for the subject item and the at least some information for the immediately adjacent item.

2. The method of claim 1, further comprising configuring an act of traversing through the one or more levels found along the predetermined flow comprises at least one of, traversing from a purchase requisition data object to a purchase order data object identified from the plurality of database tables via the computer network, traversing from the purchase order data object to a payable invoice data object identified from the plurality of database tables via the computer network, traversing from the payable invoice data object to a project expenditure data object identified from the plurality of database tables via the computer network, traversing from the project expenditure to a payable invoice data object identified from the plurality of database tables via the computer network, traversing from the payable invoice data object to the purchase order data object, or traversing from purchase order data object to a requisition data object identified from the plurality of database tables via the computer network.

3. The method of claim 1, wherein the subject item is a line item in a first document, and the one or more immediately adjacent items are from a second document identified from the plurality of database tables via the computer network.

4. The method of claim 1, determining the traversal path further comprising:

identifying the subject item from a first database table of the plurality of database tables;

determining whether the subject item corresponds to more than one match indicator;

identifying a match indicator of the subject item;

identifying a first item in the one or more immediately adjacent items comprising one or more successor items or predecessor items from a second database table based in part or in whole upon results of determining whether the subject item corresponds to more than one match indicator at least by comparing a first match indicator of the first item with the match indicator to determine whether the first match indicator of the first item matches the match indicator of the subject item;

generating a link between the subject item and the first item in the traversal path when the first match indicator of the first item is determined to match the match indicator of the subject item; and repeating generation of the one or more links for the traversal path until a second item corresponding to no match indicator in a direction of traversal is reached.

5. The method of claim 1, further comprising:

configuring, for the plurality of database tables, a database cluster comprising a first database table storing the subject item, a second database table storing one or more successor items of the one or more immediately adjacent items, and a third database table storing one or more predecessor items of the one or more immediately adjacent items;

configuring an application services cluster coupled to an application programming interface and comprising a plurality of computing nodes each executing one or more traversal services, the application services cluster coupled to the database cluster via the application programming interface;

configuring a configuration interface comprising a predecessor traversal configurator generating one or more predecessor traversal paths to traverse from the subject item to the one or more predecessors but not the one or more successor items, a successor traversal configurator generating one or more successor traversal paths to traverse from the subject item to the one or more successor items but not the one or more predecessor items, and a preference configurator for user preferences and display preferences, the configuration interface coupled to the application services cluster via an application user interface and to the database cluster via a computer network;

identifying information about a submitter, an authorizer, and a vendor corresponding to the subject item from the one or more successor items or the one or more predecessor items;

identifying two items each corresponding to a single match indicator from the one or more successor items and the one or more predecessor items;

determining ends of the traversal path based in part or in whole upon the two items each corresponding to the single match indicator;

identifying one or more instances of detail information that includes data entries that characterize an item in the one or more successor items or the one or more predecessor items;

configuring the database cluster further comprising a fourth database table storing requisition data, a fifth database table storing purchase order information, a sixth database table storing invoice information, and a seventh database storing cost information; and provisioning the database cluster, the application services cluster, and the configuration interface for traversing the one or more levels and for retrieving the at least some information and the pertinent information in the representation.

6. The method of claim 1, wherein the single user-specified indication of a subject cost item is a mouse click or a pull-down operation.

7. The method of claim 1, wherein the user interface accepts a user input in a form of clicks, swipes, keystrokes or pull-down operation, at least one of the plurality of the database tables corresponds to a document, wherein the one or more links linking the subject item to the one or more immediately adjacent items are identified by traversing through a sequence of successor or predecessor documents to locate the one or more immediately adjacent items, and the subject item has at least one match value to the at least one of the one or more immediately adjacent items, traversing one or more levels from the subject item to at least one of the one or more immediately adjacent items is automated based upon the one or more traversal configuration parameters that are configured prior to receiving the single user-specified indication at the user interface, traversing the one or more levels comprises traversing from a project expenditure to a payable invoice, traversing from the payable invoice to a purchase order to traversing from the purchase order to a purchase requisition, traversing from the purchase requisition to the purchase order, traversing from the purchase order to the payable invoice, or traversing from the payable invoice to the project expenditure, wherein traversing one or more levels uses an application programming interface, the at least some information retrieved from the at least one of the one or more immediately adjacent items comprises instances of detail information which includes data entries that characterize a respective item, the one or more traversal configuration parameters are stored persistently in a repository, the one or more traversal configuration parameters comprise a flow name, a particular sequence of documents associated with a respective data flow, and details and parameters associated with each document, wherein each document comprises at least one flow identifier, and the at least some information retrieved is presented according to user display preferences, and the representation of a data flow comprises a graphical representation of the subject item in a juxtaposition to the at least one of the immediately adjacent items.

8. A computer program product embodied in a non-transitory computer readable medium, the computer readable medium having stored thereon a sequence of instructions which, when executed by a processor causes the processor to execute a process, the process comprising:

receiving, from a user interface, a single user-specified indication of a subject item; and associating, by a configurable traversal service module stored in memory and functioning in tandem with at least a micro-processor of a computing system, a plurality of items with one or more respective match indicators that comprise one or more corresponding data item each having a match value, the plurality of items stored in a plurality of database tables in one or more databases residing on a plurality of computing nodes;

in response to the single user-specified indication,
configuring, by the configurable traversal service module, the plurality of items with the one or more respective match indicators;
predetermining a predetermined flow in response to the single user-specified indication of the subject item;
pre-configuring a number of levels to be traversed for the configurable traversal service module with one or more configuration parameters stored in a repository in response to the single user-specified indication;
determining, by the configurable traversal service module without user interactions, a traversal path through the plurality of databases tables based at least in part upon the number of levels and the predetermined flow at least by:
identifying a first match indicator associated with the subject item and having a first match value;
identifying a second match indicator having a second match value based in part or in whole upon the predetermined flow, the second match value of the second match indicator corresponds to the first match value of the first match indicator associated with the subject item;
identifying an immediately adjacent item that is associated with the second match indicator from a second database table of the plurality of database tables; and
inserting a link between the immediately adjacent item and the subject item for the traversal path;
accessing the plurality of database tables associated with a plurality of computing nodes at least by traversing one or more links linking the subject item to one or more immediately adjacent items by the configurable traversal service module in the computing system via a computer network;
traversing, at the configurable traversal service module, one or more levels from the subject item to the immediately adjacent item along a traversal path;
retrieving, at the configurable traversal service module, at least some information for the immediately adjacent item from the first database table and pertinent information for the subject item from a second database table of the plurality of database tables residing on the plurality of computing nodes; and
assembling the at least some information and the pertinent information in a representation of a data flow pertaining to the subject item in a single view at the user interface, the representation presenting correspondence between the pertinent information for the subject item and the at least some information for the immediately adjacent item.

9. The computer program product of claim 8, further comprising configuring an act of traversing through one or more levels found along the predetermined flow comprises at least one of, traversing from a purchase requisition to a purchase order, traversing from a purchase order to a payable invoice, traversing from a payable invoice to a project expenditure, traversing from a project expenditure to a payable invoice, traversing from a payable invoice to a purchase order, or traversing from a purchase order to a requisition.

10. The computer program product of claim 8, wherein the subject cost item is a first line item in a first document, and the one or more immediately adjacent items are is a second line item in a second document.

11. The computer program product of claim 8, further comprising instructions for configuring user preferences.

12. The computer program product of claim 8, further comprising instructions for establishing default configuration parameter settings including a number of default levels of traversal.

13. The computer program product of claim 8, wherein the single user-specified indication comprises a mouse click or a pull-down operation.

14. A computer system comprising:
a traversal services engine stored in memory and functioning in tandem with at least one micro-processor of a computing system and configured to receive, from a user interface, a single user-specified indication of a subject item,
the traversal services engine configured to associate a plurality of items with one or more respective match indicators that comprise one or more corresponding data item each having a match value, the plurality of items stored in a plurality of database tables in one or more databases residing on a plurality of computing nodes;
in response to single user-specified indication by executing the traversal services engine to:
configure, by the traversal services engine, the plurality of items with the one or more respective match indicators;
predetermine a predetermined flow in response to the single user-specified indication of the subject item;
pre-configure a number of levels to be traversed for the traversal service engine with one or more configuration parameters stored in a repository in response to the single user-specified indication;
determine, by the traversal services engine without user interactions, a traversal path through the plurality of databases tables based at least in part upon the number of levels and the predetermined flow at least by:
identifying a first match indicator associated with the subject item and having a first match value;
identifying a second match indicator having a second match value based in part or in whole upon the predetermined flow, the second match value of the second match indicator corresponds to the first match value of the first match indicator associated with the subject item;
identifying an immediately adjacent item that is associated with the second match indicator from a second database table of the plurality of database tables; and
inserting a link between the immediately adjacent item and the subject item for the traversal path;
access the plurality of database tables associated with a plurality of computing nodes at least by traversing one or more links along the traversal path linking the subject item to the one or more immediately adjacent items by the traversal services engine in the computing system via a computer network;
traverse, by the traversal services engine, one or more levels using the one or more links from the subject item to the immediately adjacent item along the traversal path;
retrieve, by the traversal services engine, at least some information for the immediately adjacent item from the first database table and pertinent information for the subject item from a second database table the plurality of database tables residing on the plurality of computing nodes; and a module configured to assemble the at least some of the information and the pertinent information in a representation of a data flow pertaining to the subject item in a single view at the user interface, the representation presenting correspondence between the pertinent information for the subject item and the at least some information for the immediately adjacent item.

15. The computer system of claim 14, further comprising a configuration interface to configure user preferences.

16. A graphical user interface, comprising:
a section for a user to identify a subject item in response to a single user-specified indication, the single user-specified indication triggering actions taken by a microprocessor, the actions comprising:
associating, by a configurable traversal service module stored in memory and functioning in tandem with at least a micro-processor of a computing system, a plurality of items with one or more respective match indicators that comprise one or more corresponding data item each having a match value, the plurality of items stored in a plurality of database tables in one or more databases residing on a plurality of computing nodes;
in response to the single user-specified indication,
configuring, by the configurable traversal service module, the plurality of items with the one or more respective match indicators;
predetermining a predetermined flow in response to the single user-specified indication of the subject item;
pre-configuring a number levels to be traversed for the configurable traversal service module with one or more configuration parameters stored in a repository in response to the single user-specified indication;
determining, by the configurable traversal service module without user interactions, a traversal path through the plurality of databases tables based at least in part upon the number of levels and the predetermined flow at least by:
identifying a first match indicator associated with the subject item and having a first match value;
identifying a second match indicator having a second match value based in part or in whole upon the predetermined flow, the second match value of the second match indicator corresponds to the first match value of the first match indicator associated with the subject item;
identifying an immediately adjacent item that is associated with the second match indicator from a second database table of the plurality of database tables; and
inserting a link between the immediately adjacent item and the subject item for the traversal path;
accessing the plurality of database tables associated with a plurality of computing nodes at least by traversing one or more links along the traversal path linking the subject item to one or more immediately adjacent items by the configurable traversal service module in the computing system via a computer network;
traversing, at the configurable traversal service module, one or more levels from the subject item to the immediately adjacent item along the traversal path;
retrieving, at the configurable traversal service module, at least some information for the immediately adjacent item from the first database table and pertinent information for the subject item from a second database table of the plurality of database tables residing on the plurality of computing nodes; and
assembling a representation of a data flow pertaining to the at least some information and the pertinent information in a single view in the graphical user interface in response to the single user-specified indication, the representation presenting correspondence between the pertinent information for the subject item and the at least some information for the immediately adjacent item.

17. The graphical user interface of claim 16, further comprising a configuration interface that accepts user input to configure user preferences.

18. The graphical user interface of claim 16, further comprising a configuration interface that accepts user input to establish default configuration parameter settings, including a number of default levels of traversal.

19. The graphical user interface of claim 16, further comprising a drill-down view for viewing details of a particular item in the data flow.

* * * * *